Patented Oct. 5, 1943

2,330,950

UNITED STATES PATENT OFFICE 2,330,950

CERAMIC INSULATOR AND METHOD OF MAKING THE SAME

Roelof Dirk Bügel, Eindhoven, Netherlands, assignor, by mesne assignments, to Hartford National Bank and Trust Company, Hartford, Conn., as trustee No Drawing. Application February 28, 1940, Serial No. 321,317. In the Netherlands May 17, 1939

10 Claims. (Cl. 106—62)

My invention relates to making ceramic insulators from titanium dioxide, and particularly to insulators for use as the dielectric of an electrical condenser.

The main object of my invention is to produce an insulator having a high dielectric constant and low dielectric losses.

It has been proposed to make such insulators by sintering titanium dioxide products to compactness without the addition of a ceramic sintering agent while taking special precautions to prevent the titanium dioxide products from being reduced to lower conductive oxides. This result can be obtained by slowly cooling from the sintering temperature to below that temperature at which dissociation of the titanium dioxide starts, or by a supplementary heating for some time at a temperature which is below the temperature of dissociation but at which the speed of reaction is still sufficiently high. This slow cooling, or supplementary heating is carried out in such an oxidizing atmosphere and for such a long time as to allow the titanium dioxide to be reformed completely.

However, even when employing the above measures to ensure a sufficiently oxidizing sintering of titanium dioxide, the resulting material generally exhibits comparatively high dielectric losses, for example of the order of $100 \times 10^{-4}$ at a wave-length of 200 meters. The U. S. application S. N. 195,418 to Goede et al., now U. S. Patent No. 2,270,872, issued January 27, 1942, describes a method by which this dielectric loss factor can be reduced, at least with small bodies, by rapidly cooling the body from a temperature slightly below the temperature of dissociation of the titanium dioxide to a temperature of at least about 700° C.; a slow cooling below the latter temperature has no appreciable effect upon the dielectric properties of the final product. However, as it is difficult to cool sufficiently rapidly bodies of large volume and weight, this method is not well adapted for the manufacture of comparatively large bodies.

I have found that the dielectric losses in oxidizingly sintered titanium dioxide are caused by certain impurities and that the influence of these impurities is much greater in the case of products which are cooled slowly from a temperature slightly below the temperature of dissociation to a temperature of about 700° C. than in the case of products which are cooled rapidly in this temperature range. This is the case even when using commercially pure preparations of titanium dioxide, which frequently contain from a half to one per cent of impurities which can be removed only with very great difficulty. Not only oxides of alkali but also of alkaline earth metals Ca, Sr and Ba may have a very deleterious influence. These impurities will be referred to hereinafter as "basic oxides or impurities."

I have also found that the deleterious influence of these basic impurities depends to a great extent upon the presence of certain other oxides, and that this influence is considerably less if the titanium dioxide also contains one or more oxides of other elements of the main groups of the Periodical System capable of forcing salts with the basic oxides (vide Periodical System of the Elements by Prof. A. von Antropoff, published by Koehler & Volckmar A. G. & Co., Leipsic, 1925).

In accordance with the invention I use titanium dioxide material which has such a purity that it contains not more than 1% by weight of basic oxides, thus taking into account that the effect of these basic oxides upon the reduction of the dielectric constant is disproportionately great in relation to the content of impurities in the titanium dioxide. More particularly, I make the insulator of titanium dioxide which is sintered to compactness and contains, in addition to not more than 1% of basic impurities, a sufficient quantity i. e., "neutralizing quantity" of oxides of other elements of the main groups of the periodical system capable of forming salts with the basic oxides and "neutralize" the basic impurities.

Although I shall use the term "oxides capable of forming salts with the basic impurities" to indicate the oxides which are present in addition to the basic impurities, which oxides may be considered as amphoteric or acid oxides, it should be understood that the invention is not limited to the fact that after sintering and cooling, the salts concerned are actually present as such in the titanium dioxide. It is very difficult to ascertain anything about the form in which these various oxides are contained in the sintered titanium dioxide due to the very small quantities that come under consideration.

The term "neutralizing quantity" includes a quantity which is exactly equivalent to the amount of basic oxide and also a quantity which is slightly in excess of this amount. In other words the term "neutralizing quantity" can be considered as a quantity which is approximately the same as or in the neighborhood of the stoichiometric quantity. In practice even the use of a quantity which is slightly in excess of the stoichiometric amount of the amphoteric or acid oxides, for example, a few tenths of a per cent in excess, makes it possible to reduce the dielectric loss factor ten or a hundred times. It is therefore not to be expected that the surprising results of the invention are restricted to the use of the exact stoichiometric amount. As a result of exhaustive experiments, I have found that the quantity of acid or amphoteric oxides necessary and sufficient to give a high reduction of the dielectric loss factor is generally in the neighborhood of a quantity equivalent to the basic oxides, but that an excess of acid or amphoteric oxides generally reduces the loss factor to a slightly further extent. In practice I generally use a suitable excess of the said acid or amphoteric oxides inter alia because it is very difficult to distribute the very small quantities involved in an entirely uniform manner through the material to be treated. Thus the use of an excess will insure more readily that a sufficient quantity of the acid or amphoteric oxides referred to is present throughout the material. However, it is preferable not to use a large excess of these oxides because they would reduce the dielectric constant to an excessive extent. I have found that it is possible with titanium dioxide containing not more than 1% of basic impurities to which the invention relates, to come to a technical compromise with the result that the dielectric constant is at least 95 and at the same time the dielectric loss factor does not exceed $20 \times 10^{-4}$ at 200 meters.

If the starting material does not satisfy the requirement according to the invention, as is generally the case with commercial technical titanium dioxide preparations, I may add a small quantity of the acid or amphoteric oxides in order that the said requirement may be satisfied.

As acid or amphoteric oxides for use in practising the invention, which naturally must have a high melting point exceeding about 1200° C., we may mention BeO, $Al_2O_3$, $SiO_2$ and $ZrO_2$. Preferably $Al_2O_3$ is added, since for obtaining low dielectric losses only a very small quantity is required and consequently the dielectric constant of the titanium dioxide material is decreased a small extent only. Furthermore $Al_2O_3$ offers the advantage of being cheap.

In manufacturing insulators according to the invention, which is generally not restricted to bodies of small size, I may employ the above-mentioned method by which reduction of the titanium dioxide during sintering is avoided or is compensated for.

Good results are obtained in the method of the invention when rapidly cooling from a temperature slightly below the temperature of dissociation of the titanium dioxide, because in such cases it is possible to reduce the loss factor even to below $12 \times 10^{-4}$ at 200 meters. It is even possible to obtain a loss factor of $3 \times 10^{-4}$, or lower at 200 meters with preparations containing less than 0.3% of basic impurities. It is in addition, of particular advantage that in these circumstances the dielectric loss factor at low frequencies is very low, i. e. lower than $10-10^{-4}$ at 1800 cycles sec. In this case the dielectric constant exceeds 100.

In order that the invention may be clearly understood and readily carried into effect, I shall describe the same in more detail with reference to the following specific examples:

Example I

I start with a commercial titanium dioxide preparation in the rutile form containing 0.3% CaO, 0.4% BaO, 0.5% $Sb_2O_3$, traces of $Al_2O_3$ and $SiO_2$, 0.02% $Fe_2O_3$, 0.035% $Na_2O+K_2O$ in addition to $TiO_2$ and loss due to burning. This preparation is mixed with a solution of an organic binder, kneaded and pressed into a body of the required shape. The body is then dried and sintered for about half an hour at a temperature of about 1,500° C., in a gas furnace in which the combustion gases do not come into direct contact with the body.

The above operations are carried out by the usual processes and if cooling to room temperature is then effected at a uniform and slow rate, for instance in about 1½ hours, the product obtained will have a loss factor exceeding $100 \times 10^{-4}$ at a wave-length of 200 meters and a dielectric constant of about 103.

If the rutile powder, which contains per 100 grs. $0.4/77=0.0052$ gram-equivalent of BaO and $0.6/28=0.0107$ gram-equivalent of CaO, consequently a total amount of 0.016 gram-equivalent of detrimental basic oxides, is mixed prior to the pressing with 0.5% $Al_2O_3$, i. e., $0.5/17=0.029$ gram-equivalent per 100 grs. or in other words a small excess relative to the basic oxides present, and if this material is formed in the above manner into a body sintered to compactness, the resulting body will have a loss factor from 15 to $20 \times 10^{-4}$ at 200 meters and a dielectric constant of about 97. If in the latter case the body is cooled, after sintering, in about half an hour to 1100° C., and is then cooled in air, the resulting body will have a loss factor from about 4 to $5 \times 10^{-4}$ at 200 meters.

Example II

I start with a very pure titanium dioxide preparation in the rutile form and containing only 0.1% BaO and CaO, less than 0.1% $Na_2O+K_2O$, 0.2% $SiO_2$, 0.2% $Al_2O_3$ and 0.2% $Fe_2O_3$ in addition to $TiO_2$ and loss due to burning. This preparation is treated in the manner described in Example I, sintered at about 1525° C., for half an hour, cooled in half an hour to about 1100° C., and then cooled in air. The resulting body has a loss factor from 1 to $1½ \times 10^{-4}$ at 200 meters and of $5 \times 10^{-4}$ at 1800 cycles/sec., and a dielectric constant of about 105.

Example III

I start with a titanium dioxide preparation in the rutile form containing, as impurities, 0.3% $Na_2O$, 0.1% CaO, 0.05% BaO, 0.1% MgO, 0.2% $Al_2O_3$, 0.2% $Fe_2O_3$. This preparation is pressed into a body of the desired shape in the manner described in Example I and the body is sintered at about 1500° C., for half an hour.

After being slowly cooled to room temperature the body has a dielectric loss factor of $70 \times 10^{-4}$ at 200 meters. By rapid cooling from about 1100° C. the loss factor is decreased to about $14 \times 10^{-4}$. If about 0.3% $SiO_2$ is added to the starting material, the loss factor falls in the first instance, i. e. with the slow cooling, to about $10 \times 10^{-4}$ and in the latter case i. e. with rapid cooling, to about $2.5 \times 10^{-4}$, and the dielectric constant in both cases will be about 98.

Example IV

I start with a titanium dioxide preparation in the rutile form containing as impurities 0.6% CaO, 0.05% BaO, 0.2% $Fe_2O_3$, 0.3% $Al_2O_3$, 0.1 MgO, less than 0.1 $Na_2O+K_2O$. This preparation when treated similarly to Example I with slow cooling results in products having a loss factor of $50 \times 10^{-4}$ measured at 200 meters. If about 0.5% $Al_2O_3$ is added to the starting preparation, the loss factor measured at 200 meters will be about $3 \times 10^{-4}$, and the dielectric constant will be about 96.

The measurements of the dielectric values mentioned in the above examples were obtained with small tubes having an inside diameter of about 3 mms. and an outside diameter of about 4 mms.

Although I have described my invention with reference to certain applications and with the use of specific examples I do not desire to be limited thereto because obvious modifications will appear to one skilled in the art.

What I claim is:

1. As a material for making a ceramic insulator, titanium dioxide containing not more than 1% by weight of basic impurities and amphoteric oxides capable of forming salts with the basic impurities, said amphoteric oxides being present in approximately the stoichiometric amount required to convert said impurities into salts.

2. As a material for making a ceramic insulator, titanium dioxide containing less than 0.3% by weight of basic impurities and amphoteric oxides capable of forming salts with the basic impurities, said amphoteric oxides being present in approximately the stoichiometric amount required to convert said impurities into salts.

3. As a material for making a ceramic insulator, titanium dioxide containing less than 1% by weight of basic impurities and approximately the stoichiometric amount of alumina required to convert said impurities into salts.

4. A ceramic insulator sintered to compactness consisting of titanium dioxide containing not more than 1% by weight of basic impurities and approximately the stoichiometric quantity of amphoteric oxides capable of forming salts with the basic impurities, said insulator having a dielectric constant not less than 95 and a dielectric loss factor not more than $20 \times 10^{-4}$ at 200 meters.

5. A method of making a ceramic insulator comprising forming into a desired shape and sintering to compactness while avoiding reduction a titanium dioxide preparation containing not more than 1% basic impurities and approximately the stoichiometric quantity of amphoteric oxides capable of forming salts with the basic impurities.

6. A method of making a ceramic insulator comprising the steps of adding to a titanium dioxide preparation containing not more than 1% basic impurities approximately the stoichiometric quantity of amphoteric oxides capable of forming salts with the basic impurities, forming the preparation into a desired shape, and sintering the preparation while avoiding reduction of the titanium dioxide.

7. A method of making a ceramic insulator from a titanium dioxide preparation containing not more than 0.3% of basic impurities and approximately the stoichiometric quantity of amphoteric oxides capable of forming salts with the basic impurities, comprising forming the preparation into a desired shape, and sintering the preparation to compactness while avoiding reduction of the titanium dioxide.

8. A method of making a ceramic insulator from a titanium dioxide preparation containing not more than 1% of basic impurities, and approximately the stoichiometric quantity of amphoteric oxides capable of forming salts with the basic impurities, comprising sintering the preparation to compactness, and rapidly cooling the sintered material from a temperature below the dissociation temperature to a temperature of about 700° C.

9. As a material for making a ceramic insulator, titanium dioxide containing not more than 1% by weight of basic impurities, and an oxide of one of the group consisting of beryllium, aluminum, silicon and zirconium, said oxide being present in an amount slightly in excess of the stoichiometric amount required to convert said impurities into salts.

10. As a material for making a ceramic insulator, titanium dioxide containing not more than 1% by weight of basic impurities, and an amphoteric oxide capable of forming salts with the basic impurities, said oxide being present in an amount in the neighborhood of a quantity stoichiometrically equivalent to the basic impurities.

ROELOF DIRK BÜGEL.

---

Certificate of Correction

Patent No. 2,330,950.     October 5, 1943.

ROELOF DIRK BÜGEL

It is hereby certified that errors appear in the printed specification of the above numbered patent requiring correction as follows: Page 1, second column, line 13, for "forcing" read *forming*; page 2, first column, line 66, for "10—10⁻⁴" read $10 \times 10^{-4}$; and that the said Letters Patent should be read with these corrections therein that the same may conform to the record of the case in the Patent Office.

Signed and sealed this 30th day of November, A. D. 1943.

[SEAL]

HENRY VAN ARSDALE.

cooling results in products having a loss factor of $50 \times 10^{-4}$ measured at 200 meters. If about 0.5% $Al_2O_3$ is added to the starting preparation, the loss factor measured at 200 meters will be about $3 \times 10^{-4}$, and the dielectric constant will be about 96.

The measurements of the dielectric values mentioned in the above examples were obtained with small tubes having an inside diameter of about 3 mms. and an outside diameter of about 4 mms.

Although I have described my invention with reference to certain applications and with the use of specific examples I do not desire to be limited thereto because obvious modifications will appear to one skilled in the art.

What I claim is:

1. As a material for making a ceramic insulator, titanium dioxide containing not more than 1% by weight of basic impurities and amphoteric oxides capable of forming salts with the basic impurities, said amphoteric oxides being present in approximately the stoichiometric amount required to convert said impurities into salts.

2. As a material for making a ceramic insulator, titanium dioxide containing less than 0.3% by weight of basic impurities and amphoteric oxides capable of forming salts with the basic impurities, said amphoteric oxides being present in approximately the stoichiometric amount required to convert said impurities into salts.

3. As a material for making a ceramic insulator, titanium dioxide containing less than 1% by weight of basic impurities and approximately the stoichiometric amount of alumina required to convert said impurities into salts.

4. A ceramic insulator sintered to compactness consisting of titanium dioxide containing not more than 1% by weight of basic impurities and approximately the stoichiometric quantity of amphoteric oxides capable of forming salts with the basic impurities, said insulator having a dielectric constant not less than 95 and a dielectric loss factor not more than $20 \times 10^{-4}$ at 200 meters.

5. A method of making a ceramic insulator comprising forming into a desired shape and sintering to compactness while avoiding reduction a titanium dioxide preparation containing not more than 1% basic impurities and approximately the stoichiometric quantity of amphoteric oxides capable of forming salts with the basic impurities.

6. A method of making a ceramic insulator comprising the steps of adding to a titanium dioxide preparation containing not more than 1% basic impurities approximately the stoichiometric quantity of amphoteric oxides capable of forming salts with the basic impurities, forming the preparation into a desired shape, and sintering the preparation while avoiding reduction of the titanium dioxide.

7. A method of making a ceramic insulator from a titanium dioxide preparation containing not more than 0.3% of basic impurities and approximately the stoichiometric quantity of amphoteric oxides capable of forming salts with the basic impurities, comprising forming the preparation into a desired shape, and sintering the preparation to compactness while avoiding reduction of the titanium dioxide.

8. A method of making a ceramic insulator from a titanium dioxide preparation containing not more than 1% of basic impurities, and approximately the stoichiometric quantity of amphoteric oxides capable of forming salts with the basic impurities, comprising sintering the preparation to compactness, and rapidly cooling the sintered material from a temperature below the dissociation temperature to a temperature of about 700° C.

9. As a material for making a ceramic insulator, titanium dioxide containing not more than 1% by weight of basic impurities, and an oxide of one of the group consisting of berylium, aluminum, silicon and zirconium, said oxide being present in an amount slightly in excess of the stoichiometric amount required to convert said impurities into salts.

10. As a material for making a ceramic insulator, titanium dioxide containing not more than 1% by weight of basic impurities, and an amphoteric oxide capable of forming salts with the basic impurities, said oxide being present in an amount in the neighborhood of a quantity stoichiometrically equivalent to the basic impurities.

ROELOF DIRK BÜGEL.

---

Certificate of Correction

Patent No. 2,330,950.　　　　　　　　　　　　　　　　　　October 5, 1943.

ROELOF DIRK BÜGEL

It is hereby certified that errors appear in the printed specification of the above numbered patent requiring correction as follows: Page 1, second column, line 13, for "forcing" read *forming*; page 2, first column, line 66, for "10—10$^{-4}$" read $10 \times 10^{-4}$; and that the said Letters Patent should be read with these corrections therein that the same may conform to the record of the case in the Patent Office.

Signed and sealed this 30th day of November, A. D. 1943.

[SEAL]

HENRY VAN ARSDALE.